March 29, 1960  R. H. GEORGE  2,930,658
AIR BRAKE SYSTEM FOR AUTOMOTIVE VEHICLES
Filed April 24, 1958  2 Sheets-Sheet 2
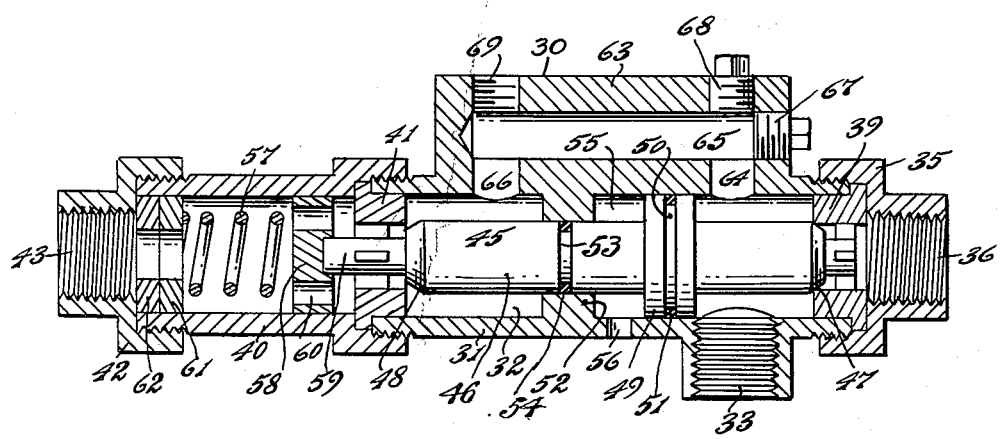
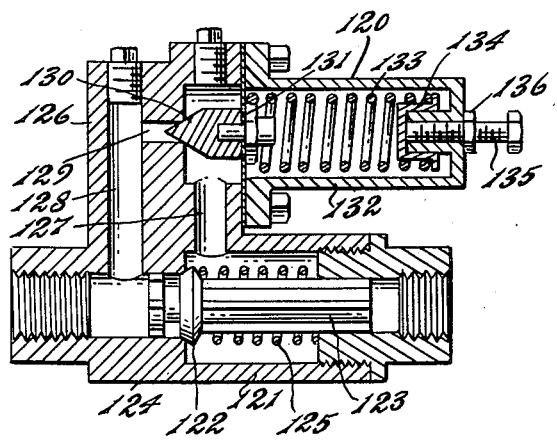
INVENTOR
Robert H. George
BY
Jas. C. Hobensmith
ATTORNEY United States Patent Office 2,930,658
Patented Mar. 29, 1960

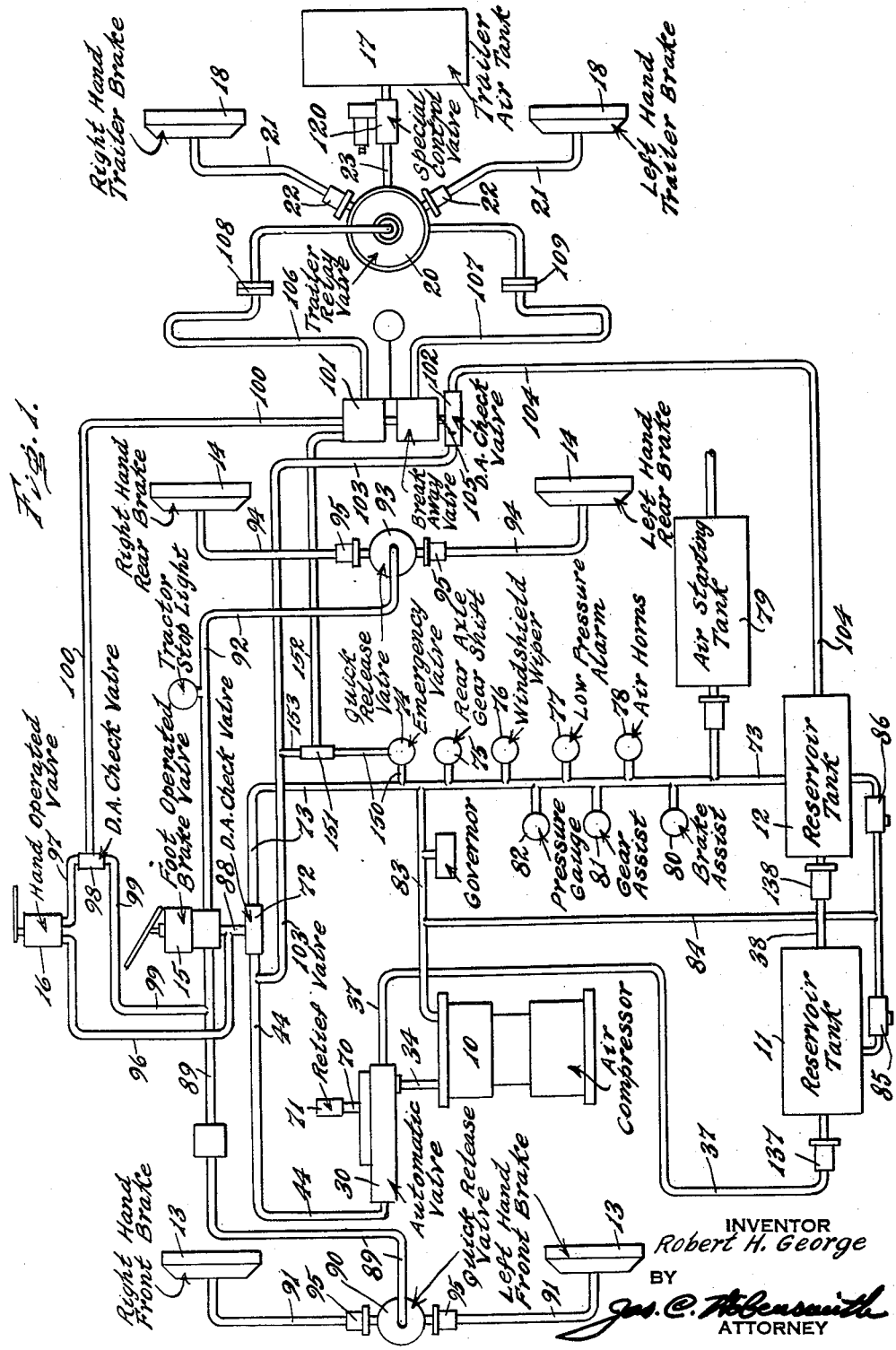

2,930,658
AIR BRAKE SYSTEM FOR AUTOMOTIVE VEHICLES

Robert H. George, Melrose Park, Pa.

Application April 24, 1958, Serial No. 730,700

5 Claims. (Cl. 303—8)

This invention relates to air brake systems for automotive vehicles, and it relates more particularly to air brake systems adaptable for use on heavy vehicles of the tractor trailer type.

In the use of heavy automotive vehicles of the tractor trailer types many wrecks, and much damage to other vehicle on the highways, are caused by the socalled jack-knifing of the trailers by reason of the application of the brakes to the tractor when the conditions are such that the trailer brakes cannot be applied by reason of insufficient pressure in the air reservoir tank of the trailer.

In my previous Letters Patent No. 2,834,638 there is shown and described an air brake system for heavy automotive vehicles having certain safety features, in which, in the event of the pressure in the air reservoirs of the tractor and trailer falling below safe operational limits, the air under pressure coming direct from the compressor would be applied to the brakes by the proper operation of the control valves without waiting for the pressure to be restored in the reservoirs to a proper working pressure. This invention while found to be quite useful with heavy vehicles of the truck and bus type, was not as valuable for use in connection with vehicles of the tractor trailer type, as improper operation of the same would sometimes result in jack-knifing of the trailer with the consequent likelihood of damage to other vehicles on the highways, as well as to the tractors and trailers so equipped.

Accordingly, for the purpose of minimizing the occurrence of jack-knifing of tractor trailer vehicles equipped as aforesaid, as well as with air brakes of other kinds, there was developed the arrangement shown and described in my previous application for Letters Patent Serial No. 554,268, in which, whenever the pressure in the reservoir tanks fell below proper operating pressures, the air coming under pressure from the compressor would be applied directly to the brakes to apply the same whenever there is little or no air in the reservoir tanks available for such purpose, and this without any action or control by the operator, at least until the air in the auxiliary reservoir tank of the trailer has been restored to a safe operating pressure.

The present invention contemplates further improvements in air brake systems, and more particularly those used in vehicles of the tractor trailer type by means of which the safety factor in the use of such vehicles will be greatly increased.

The principal object of the present invention is to provide an airbrake system for automotive vehicles, particularly of the tractor trailer type by means of which the air under pressure coming from the compressor may be applied directly to the brakes without first passing to the reservoir tanks to build up the working pressure therein to a safe operating degree, whenever the pressure in the reservoir tanks falls below such safe operating degree.

A further object of the invention is to provide, in an air brake system of the character aforesaid, an arrangement whereby the air under pressure coming from the compressor may be first applied to the operation of the trailer brakes independently of the tractor brakes whenever there is insufficient pressure in the reservoir tanks for the proper operation of the brakes.

A further object of the invention is to provide, in an air brake system of the character aforesaid, an arrangement whereby, whenever there is insufficient pressure in the reservoir tanks, the air under pressure coming from the compressor may be first applied to the brakes of both the tractor and trailer, or to those of the trailer only, as desired by the operator, after which the air coming from the compressor will automatically pass to the trailer reservoir tank to build up the pressure therein to a safe operating degree, and after the pressure in the trailer reservoir tank has been brought to the required amount, the air coming from the compressor will then pass to the main reservoir tanks which are usually carried on the tractor and will restore the pressure therein.

The nature and characteristic features of the present invention will be more readily understood from the following description, taken in connection with the accompanying drawings forming part hereof in which:

Figure 1 is a diagrammatic view of an air brake system for automotive vehicles of the tractor trailer type, said system embodying the main features of the present invention;

Fig. 2 is a longitudinal central sectional view of a special automatic valve used in the brake system of the present invention, the same being also used in the systems of my previous inventions hereinbefore referred to; and Fig. 3 is a similar view of another special automatic control valve used in the brake system of the present invention, the same also being similar to a control valve used in connection with one of my aforesaid previous inventions.

It should of course be understood that the description and drawings herein are illustrative merely, and that various modifications and changes may be made in the system disclosed without departing from the spirit of the invention.

Referring to the drawings, in the particular embodiment of the invention therein shown, the general arrangement of the braking system of the present invention is in many respects similar to the arrangements commonly used in heavy automotive vehicles, and particularly those in which detachable trailers are employed in connection with tractors, the trailer braking system being coupled to the tractor braking system when the tractor and trailer are used together, and with the exception of the special automatic valves of my own invention which were used in the arrangements shown and described in my previous applications hereinbefore referred to, the other parts designated may be the same as, or very similar to, those at present in common use in heavy vehicle braking systems.

There is provided, of course, an air compressor or pump 10, and usually a pair of reservoir tanks 11 and 12 for receiving the air which is compressed by said compressor or pump 10. Normally a supply of air under proper working pressure is maintained in said reservoir tanks 11 and 12.

The tractors are usually provided with right and left hand air operated front wheel brakes 13, and similar rear wheel brakes 14, to and from which the air ordinarily passes under the control of the usual and ordinary foot operated brake valve 15, and also, a hand operated valve 16, which is provided to permit the operation of the trailer brakes 18 independently of the tractor brakes.

The trailer is ordinarily provided with an air reservoir tank 17 from which the air under pressure, when the system is operating normally, may be transmitted to and from the right and left hand air operated trailer brakes 18 through the hose or pipes 21 extending from the relay valve 20 of the usual and ordinary kind commonly used for such purpose. The relay valve 20 is connected by pipe line 23 to the trailer reservoir tank 17, as is usual in air brake systems of this general type. A special control valve 120 is disposed in pipe line 23 for a purpose to be hereinafter set forth.

In air brake systems for heavy vehicles, as before made, the air compressor was usually connected directly to the main reservoir tanks, but in carrying out the present invention there is additionally provided, as in the devices of my previous applications for Letters Patent hereinbefore referred to, an additional special automatic valve 30 which serves to by-pass the air for a novel purpose and in a different manner, to insure safe operation, whenever the pressure in the air reservoir tanks falls below a certain amount. This valve is shown in detail in Fig. 2 of the drawing.

The special valve 30 comprises a main housing 31, having an internal cylindrical bore 32, and near one end of the housing 31 there is provided, on one side, an inlet nipple 33, for the purpose of connecting pipe line 34 which extends directly from the air compressor 10 to said valve 30.

On the end of the valve housing 31, adjacent the side inlet nipple 33, there is mounted a bonnet 35 having an outlet nipple 36 for the purpose of connecting a pipe line 37 which extends to the reservoir tank 11, which in turn is connected by pipe line 38 to reservoir tank 12, for the normal maintenance of a supply of air under proper working pressure in said tanks. Interposed in the pipe line 37 is a check valve 137, and in the pipe line 38, a check valve 138, to prevent the loss of the air through said pipe lines in the event of breakage or in the event of failure of the special valve 30 to function properly.

The bonnet 35 of special valve 30 also serves to maintain a flanged bushing 39 in position to provide a valve seat at that end of the housing 31. At the other end of the housing 31 there is mounted a sleeve like extension 40 of the housing serving to hold and retain a flanged bushing 41 which provides a valve seat at that end of the housing 31.

Mounting on the end of the sleeve like extension 40 of special valve 30 is a bonnet 42 provided with an auxiliary outlet nipple 43 from which extends a pipe line 44 for a purpose to be presently explained.

Slidably mounted within the valve housing 31 is a valve member 45, the same comprising an elongated cylinder shaped at each end to provide valve faces 47 and 48, respectively, which are adapted to be alternatively seated, when operated as hereinafter set forth, on the valve seats provided by the flanged bushings 39 and 41 at the respective ends of the housing 31.

Intermediate the ends of the valve member 45 is an enlarged portion 49 constituting, in effect, a piston in which is provided, in an annular recess 50 therein, a packing ring 51 serving to prevent passage of air past said piston like portion 49.

The interior of the housing 31 is also provided with an inwardly projecting annulus 52, in conjunction with which the cylindrical portion 46 of the valve member 45 is provided with a groove 53 in which a packing ring 54 is located, to prevent the passage of air past said annulus 52. The annulus 52 is positioned within the bore 30 of the valve housing 31, a sufficient distance from the piston portion 49 of valve member 45 to provide a central chamber 55 which is in communication with the exterior through a port 56.

The sleeve like extension 40, which is mounted on the end of the housing 31 remote from the inlet nipple 33, permits the mounting, in the valve structure, of a coil spring 57, one end of which is seated against a head or guide member 58, which is mounted on the end of an extension 59 which projects from the end of valve member 45 through the valve seat bushing 41.

The head or guide member 58 is provided with passageways 60 to permit the flow of air from the interior of the valve housing 31, through the sleeve like extension 40 thereof to the outlet nipple 43 to which the pipe line 44 is connected.

The other end of the coil spring 57 bears against a ring member 61 which, as shown, is in turn seated on another ring member 62 of similar size and shape. By substituting other ring members of different thicknesses, the tension of the coil spring may be adjusted to the desired pressure whenever it may be necessary to do so.

The valve housing 31 is also provided, intermediate its ends, with a projecting portion 63 through which passageways 64, 65 and 66 are bored. Certain of the holes, through which the tools are inserted for boring the aforesaid passageways, are closed by means of threaded plugs 67 and 68, whereas, one of said holes 69 is used for the connection therewith of a pipe 70 leading to a relief valve 71 to prevent damage to the valve 30 in the event of air becoming entrapped at abnormal pressure.

It will be noted that the valve member 45, in the absence of sufficient pressure in the tractor reservoir tanks 11 and 12 will be impelled by the coil spring 57, to cause the valve face 47 of the valve member 45 to be seated on the flanged bushing 39.

When the valve member is in the position as aforesaid, air flowing from the compressor 10 will pass around the valve member 45, and through the passageways 64, 65 and 66 to the other end of the housing 31, and as the valve face 48 provided at that end of the valve member 45 will then be removed from its seat, the air will flow through the flanged bushing 41, through the passageways 60 in the head member 58, and through the sleeve 40 to te outlet nipple 43, to which the pipe line 44 is connected.

When, however, the air brake system is functioning properly and the air in the reservoir tanks is of sufficient pressure to overcome the tension of the coil spring 57, the air from the compressor 10 will flow past the valve face 47 of the valve member 45 at the inlet end of the housing 31, thence through flanged bushing 39, and through the nipple 36 to the pipe 37 which is connected thereto. The air then passes through the pipe 37 directly to the main reservoir tanks 11 and 12, carried by the tractor, for normal use when required from time to time.

The pipe line 44 extends from the automatic valve 30 to one end of a double acting check valve 72, to the other end of which a pipe line 73 is connected. The pipe line 73 extends from the reservoir tank 12 for the normal operation of the brakes, and the various instruments and devices which are usually activated or operated by the air under pressure in the reservoir tanks, for example the emergency valve 74, the rear axle gear shift 75, the windshield wiper 76, the low pressure alarm 77, the air operated horns 78, the air starting tank 79, the brake assist 80, the gear assist 81 and the pressure indicator gauge 82, may each be connected to pipe line 73.

A branch pipe line 83 may extend from the pipe line 73 for the governor control of the compressor 10, and from the pipe line 83 an auxiliary pipe line 84 may extend to the reservoir tanks 11 and 12 for the operation of ejector valves 85 and 86 for the removal of condensate from the reservoir tanks.

The emergency valve 74, which is provided to insure the closing of breakaway valve 101 in the event of the accidental separation of the trailer from the tractor, is interposed in pipe line 150, which extends from the main operating pipe line 73 to one end of a double acting check valve 151, which is connected to the break away valve 101 by pipe line 152. The other end of check valve 151 is connected by pipe 153 to pipe line 103. By this arrangement, in the event of the accidental separation of the trailer from the tractor at a time when the pressure in the tractor reservoir tanks is below normal, a part of the air coming direct from the compressor through pipe line 44 will pass through pipe lines 103 and 153 to check valve 151 and thence by pipe line 152 to the breakaway valve 101 for the automatic operation thereof to close the same.

The check valve 72 is connected by pipe 88 to the foot operated brake control valve 15, the arrangement being such that the air will flow either from the main reservoir tanks 11 and 12 under normal conditions through pipe line 73 or, when the pressure in said tanks is below safe working limits, the air will pass through the automatic valve 30 to said foot operated valve 15 directly from the compressor through the pipe line 44.

The foot operated brake control valve 15 is connected to the front tractor brakes 13 by a pipe line 89 to a quick release valve 90 of the ordinary kind, from which the hose lines 91 extend to said front brakes 13. Likewise the foot operated control valve 15 is also connected to the rear tractor brakes 14 by a pipe line 92 to the quick release valve 93, from which hose lines 94 extend to said rear tractor brakes 14. Interposed in the hose lines 91 and 94 are shut off valves 95 of the ordinary type to close the supply to said hose lines in the event of rupture thereof, or of the brake diaphragms.

A branch pipe line 96 extends from pipe 88 to the hand operated valve 16 from which a pipe line 97 extends to one side of a double acting check valve 98. Another branch pipe line 99 extends from pipe line 89 to the other side of check valve 98. A pipe line 100 extends from check valve 98 to a "breakaway" valve 101 of the usual type employed in air brake systems of tractor trailer vehicles so that the tractor may be detached from the trailer, and so that the supply of air will be automatically shut off if the trailer should become accidentally detached.

Adjacent the breakaway valve 101 there is provided a double acting check valve 102. A branch pipe line 103 extends from pipe line 44 to one side of check valve 102, and a pipe line 104 extends from reservoir tank 12 to the other side of check valve 102. The check valve 102 is connected by pipe 105 to the breakaway valve 101, the arrangement being such that air under such pressure as is available in the reservoir tanks 11 and 12 under normal conditions, or in the pipe line 44 when the pressure in the reservoirs 11 and 12 falls below a safe operating amount, may pass to the trailer brake operating devices.

The breakaway valve 101 is connected by hose lines 106 and 107 to the trailer relay valve 20 for the transmission of the air for the control and operation of the trailer brakes. Couplings 108 and 109 are provided in the hose lines 106 and 107, respectively.

Interposed in pipe line 23, which extends from the trailer relay valve 20 to the trailer reservoir tank 17, is a special automatic valve 120 for the control of the flow of the air to and from the trailer reservoir tank 17, the construction and arrangement of this valve being shown in detail in Fig. 3 of the drawings.

The special valve 120, used as aforesaid in connection with the trailer reservoir tank 17, comprises a housing having a tubular portion 121 in alinement with the pipe connections, and in this portion 121 a valve member 122 is slidably mounted. The valve member 122 has a stem portion 123 which is fluted, and which said valve member is impelled to its seat 124 by a relatively light spring 125. This portion of valve 120 operates under certain conditions as a check valve for stopping the flow of the air into the trailer reservoir tank 17, but under other conditions permitting the substantially free flow of the air under pressure to actuate the brakes of the trailer when the pressure in the trailer reservoir tank 17 is built up to a normal working amount.

The special valve 120 is provided with an offset portion 126 provided with ports 127 and 128, and a port 129 which provides a passageway between the ports 127 and 128. The port 129 may be closed by a valve member 130 which is carried by a flexible diaphragm 131. The flexible diaphragm 131 is secured in place by a bonnet 132. The bonnet 132 forms an auxiliary housing for a relatively heavy spring 133, one end of which is seated against the diapragm 131 and the other end of which is seated on a flanged cuplike member 134, which in turn is mounted on the inner end of an inwardly extending bolt 135 which is threaded in the outer end of the bonnet 132. A lock nut 136 may be threaded on the bolt 135 to hold the same in adjusted positions.

The foregoing arrangement is such that whenever the pressure in the port 127 reaches an amount sufficient to deflect the diaphragm 131 against the tension of the spring 133, the valve member 130 will be withdrawn from its seat, and the air under pressure will be permitted to flow through the ports 127, 129 and 128 into the trailer reservoir tank 17 to build up the pressure therein for subsequent use in the regular and normal manner.

The operation of the air brake system as hereinbefore described should now be readily understood.

Under conditions of normal operation the air in the tanks 11 and 12 will be maintained at the proper operating pressure, and also in the pipe line 37, which extends to said tanks from the special automatic valve 30, the air will be at substantially the same pressure as that in the tanks 11 and 12. This will cause the valve member 45 of said special valve 30 to be actuated, through the pressure on the piston 49, and the end 47 of the valve member 45, which would otherwise be seated on the bushing 39, as shown in Fig. 2 of the drawings, will be moved from its seat against the tension of coil spring 57.

When the valve member 45 is thus actuated the air coming from the compressor 10 will pass through the pipe 34, to the interior of the valve 30, and into the pipe 37 to maintain the proper pressure in the tanks 11 and 12 under the control of the governor of the air compressor 10.

When the system is functioning under normal operating conditions, the air from tank 12 will pass through pipe 104, check valve 105, breakaway 105, pipe line 107, trailer relay valve 20 and pipe 23, under the control of valve 120, to the trailer reservoir tank 17 to maintain the proper operating pressure therein.

During such periods, that is when the system is operating normally, the valve member 122 will be seated, except when the air in the trailer reservoir tank is being discharged to operate the trailer brakes 18, but the air, under the operating pressure, acting on the diaphragm 131 against the tension of the spring 133, will cause the valve member 130 to be moved from its seat to permit the air to pass through ports 127, 129 and 128 into the trailer reservoir tank 17 from which it may subsequently flow whenever required, for application to the trailer brakes 18, by moving the valve 122 from its seat 124 against the tension of the relatively light spring 125. The spring 125 being relatively light, will not appreciably interfere with the flow of the air from the tank 17 whenever the same is required.

Also, when the system is working under normal running conditions, whenever the operator desires to apply the brakes, this is done by the operation of the foot actuated valve 15, the air under pressure will then flow from tank 12 through pipe line 73 to check valve 72, then by pipe 88 to the foot operated valve 15, thence by pipe line 89, quick release valve 90, and hose lines 91 to the front tractor brakes 13. At the same time a part of the air supplied to the foot operated valve 15 will pass by pipe line 92, quick release valve 93, and hose lines 94 to the rear tractor brakes 14.

Furthermore, when the foot operated valve 15 is actuated, under normal operating conditions, another part of the air supplied thereto from the air reservoir tank 12 will pass from pipe line 89, through pipe line 99 to check valve 98, then by pipe line 100 to breakaway valve 101, then by hose line 106 to the trailer relay valve 20, to cause the air under-pressure in the trailer reservoir tank 17 to pass through hose lines 21 to actuate the trailer brakes 18.

Hence it will be seen that, under normal operating conditions, all of the brakes of both tractor and trailer may be simultaneously applied under the control of the foot actuated brake valve 15.

As is, of course, well understood, it is often advisable to apply the trailer brakes independently of those on the tractor, for example, to prevent jack-knifing of the trailer with respect to the tractor, particularly when sudden stops are required on down grades, or when the roads are wet, snowy, or icy. This is ordinarily done through the operation of the hand valve 16, in which event, when normal air pressure conditions exist in the system, the air under pressure coming from reservoir tank 12 through pipe 73 will, after passing through check valve 72, into pipe 88, then pass through pipe 96 to hand operated valve 16, pipe line 97, and check valve 98, then through pipe line 100 to breakaway valve 101, and thence through hose line 106 to the trailer relay valve 20 for the operation of the trailer brakes as aforesaid, but independently of the tractor brakes.

The novel arrangement comprising the present invention is provided for the purpose, whenever the pressure of the air in the reservoir tanks falls below a safe working degree, the air coming from the compressor, may then be applied directly to the brakes of the trailer either independently, or to the brakes of both the tractor and trailer, but in either event without requiring a supply of air under pressure to be built up in any reservoir tanks.

In the aforesaid connection, it will be noted that whenever the pressure of the air in the reservoir tanks 11 and 12 falls below a predetermined safe limit, the relatively heavy spring 57, of special valve 30, bearing against the head or guide member 58 will impel the valve member 45 to the position shown in Fig. 2 of the drawings, whereupon the air coming through pipe 34 from the compressor 10, will pass through ports 64, 65 and 66 to the other end of the housing 31 of automatic valve 30, to the pipe line 44 which extends to check valve 72, and thence through pipe 88 to the foot operated valve 15 so that, upon the actuation of said foot operated valve the air under the pressure generated by the compressor 10 may be directly utilized for the application of the brakes of both the tractor and trailer without waiting for a proper operating pressure to be built up in any reservoir tanks.

It will be noted that should it be desirable to apply the trailer brakes 18, independently of the tractor brakes 13 and 14, when the pressure in the reservoir tanks is below a proper operating amount, this may be readily done by the actuation of the hand operated valve 16, whereupon the air coming under such conditions directly from the compressor through pipe 34, automatic valve 30, pipe line 44, check valve 72, pipe 88, and pipe line 96, to hand operated valve 16, from which it may pass through pipe 97 and check valve 98, to pipe line 100 for passage to the trailer brake system for the independent actuation of the trailer brakes under the conditions noted above.

It will be seen that a brake system constructed and arranged as aforesaid will provide certain factors of safety and will effectively prevent the jack-knifing of the trailers of tractor trailer vehicles which has been the cause of many fatal accidents on the modern highways and turnpikes.

I claim:

1. In an air brake system for automotive vehicles of the tractor trailer type, including an air compressor, air reservoir tanks normally maintained at a predetermined working pressure for the operation of the brakes by air flowing from said tanks, a manually operable valve for normally controlling the flow of air from the reservoir tanks to the brakes for the simultaneous application of the brakes of the tractor and the trailer, a second manually operable valve for controlling the flow of air from one of said reservoir tanks for the operation of the trailer brakes independently of the tractor brakes, and means for causing the air to pass directly from the compressor through the manually operable control valves to the brakes when the pressure in the reservoir tanks falls below a predetermined normally operating amount, the combination therewith of means whereby the trailer brakes may be operated indepnedently of the tractor brakes by air passing directly from the compressor through the second manually operable valve to said trailer brakes when the pressure in the reservoir tanks is insufficient for that purpose, said means including an automatic valve having means controlling the supply of air to the reservoir tank provided for the normal operation of the trailer brakes, said automatic valve preventing the air from initially entering said last mentioned tank when the pressure of said air is less than the predetermined normal operating amount but permitting the air to pass to said reservoir tank after the trailer brakes have been applied to restore the air in said trailer reservoir tank to normal operating pressure, said last mentioned valve permitting passage of air from said reservoir tank for the normal operation of the trailer brakes when the pressure in said tank is at or above the normal operating amount.

2. In an air brake system for automotive vehicles of the tractor trailer type, including an air compressor, air reservoir tanks normally maintained at a predetermined pressure for the operation of the brakes by the air flowing from said tanks, a manually operable valve for normally controlling the flow of air from the reservoir tanks to the brakes for the simultaneous application of the brakes of the tractor and the trailer, a second manually operable valve for controlling the flow of air from one of said reservoir tanks for the operation of the trailer brakes independently of the tractor brakes, and an automatic valve for causing the air to pass directly from the compressor through the manually operable control valves to the brakes when the pressure in the reservoir tanks falls below a predetermined normal operating amount, the combination therewith of means whereby the trailer brakes may be operated independently of the tractor brakes by air passing directly from the compressor through the second manually operable valve to said trailer brakes when the pressure in the reservoir tanks is insufficient for that purpose, said means including a second automatic valve having means controlling the supply of air to the reservoir tank provided for the normal operation of the trailer brakes, said second automatic valve preventing the air from initially entering said last mentioned tank when the pressure of said air is less than the predetermined normal operating amount but permitting the air to pass to said reservoir tank after the trailer brakes have been applied to restore the air in said reservoir tank to normal operating pressure, said last mentioned valve premitting passage of air from said reservoir tank for the normal operation of the trailer brakes when the pressure in said tank is at or above the normal operating amount.

3. In an air brake system for automotive vehicles of the tractor trailer type, including an air compressor, an air reservoir tank for the tractor, air operated brakes on the tractor, an air reservoir tank for the trailer, air operated brakes on the trailer, the air in said tanks being normally maintained at a predetermined pressure for the ordinary operation of the brakes by air flowing therefrom, a manually operable valve for normally controlling the flow of air from the reservoir tanks to the brakes for the simultaneous application of the brakes of the tractor and the trailer, a second manually operable valve for controlling the flow of air for the operation of the trailer brakes independently of the tractor brakes, and an automatic valve for causing the air to pass directly from the compressor through the manually operable control valves to the brakes when the pressure in the reservoir tanks falls below a predetermined normal operating amount, the combination therewith of means whereby the trailer brakes may be operated independently of the tractor brakes by air passing directly from the compressor through the second manually operable valve to said trailer brakes when the pressure in the trailer reservoir tank is insufficient for that purpose, said means including a second automatic valve having means controlling the supply of air to said trailer reservoir tank initially preventing the air from entering said tank when the pressure of said air is less than the predetermined normal operating amount but permitting the air to pass to said trailer reservoir tank after the trailer brakes have been applied to restore the air in said trailer reservoir tank to normal operating pressure, said last mentioned valve permitting passage of air from said trailer reservoir tank for the normal operation of the trailer brakes when the pressure in said tank is at or above the normal operating amount.

4. In an air brake system for automotive vehicles of the tractor trailer type, including an air compressor, air reservoir tanks normally maintained at a predetermined pressure for the operation of the brakes by air flowing from said tanks, a relay valve on the trailer for the control and operation therethrough of the trailer brakes, a manually operable valve for normally controlling the flow of air from the reservoir tanks to the brakes for the simultaneous application of the brakes of the tractor and the brakes of the trailer through the relay valve, a second manually operable valve for controlling through the relay valve the flow of air from one of said reservoir tanks for the operation of the trailer brakes independently of the tractor brakes, and an automatic valve for causing the air to pass directly from the compressor through the manually operable control valves to the brakes when the pressure in the reservoir tanks falls below a predetermined normal operating amount, the combination therewith of means whereby the trailer brakes may be operated independently of the tractor brakes by air passing directly from the compressor through the second manually operable valve and the relay valve to said trailer brakes when the pressure in the trailer reservoir tank is insufficient for that purpose, said means including a second automatic valve having means controlling the supply of air to the reservoir tank provided for the normal operation of the trailer brakes, said second automatic valve initially preventing the air from entering said last mentioned tank when the pressure of said air is less than the predetermined normal operating amount but permitting the air to pass to said reservoir tank after the trailer brakes have been applied to restore the air in said reservoir tank to normal operating pressure, said last mentioned valve permitting passage of air from said trailer reservoir tank for the normal operation of the trailer brakes when the pressure in said tank is at or above the normal operating amount.

5. In an air brake system for automotive vehicles of the tractor trailer type, including an air compressor, an air reservoir tank for the tractor, air operated brakes on the tractor, an air reservoir tank for the trailer, air operated brakes on the trailer, a relay valve on the trailer for the control and operation therethrough of the trailer brakes, a manually operable valve for normally controlling the flow of air from the reservoir tanks to the brakes for the simultaneous application of the brakes of the tractor and the brakes of the trailer through the relay valve, a second manually operable valve for controlling through the relay valve the flow of air from the trailer reservoir tank for the operation of the trailer brakes independently of the tractor brakes, and an automatic valve for causing the air to pass directly from the compressor to the manually operable control valves when the pressure in the reservoir tanks falls below a predetermined normal operating amount, the combination therewith of means whereby the trailer brakes may be operated independently of the tractor brakes by air passing directly from the compressor through the second manually operable valve and the relay valve to said trailer brakes when the pressure in the trailer reservoir tank is insufficient for that purpose, said means including a second automatic valve interposed between the relay valve and the trailer reservoir tank, said second automatic valve having means controlling the supply of air to said trailer reservoir tank preventing the air from entering said tank when the pressure of said air is less than the predetermined normal operating amount but permitting the air to pass to said trailer reservoir tank after the trailer brakes have been applied to restore the air in said trailer reservoir tank to normal operating pressure, said last mentioned valve permitting passage of air from said trailer reservoir tank for the normal operation of the trailer brakes when the pressure in said tank is at or above the normal operating amount.

References Cited in the file of this patent

UNITED STATES PATENTS

| | | |
|---|---|---|
| 2,289,491 | Fitch | July 14, 1942 |
| 2,834,638 | George | May 13, 1958 |